US006428899B1

United States Patent
Fujiwara et al.

(10) Patent No.: US 6,428,899 B1
(45) Date of Patent: Aug. 6, 2002

(54) SHOE FOR TENSIONER DEVICE AND CHAIN GUIDE

(75) Inventors: Toru Fujiwara; Takeshi Ogawa, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/711,011

(22) Filed: Nov. 10, 2000

(30) Foreign Application Priority Data

Nov. 10, 1999 (JP) .......................................... 11-320253

(51) Int. Cl.$^7$ ............................................. B32B 27/08
(52) U.S. Cl. ................. 428/474.4; 428/221; 428/411.1; 428/476.3
(58) Field of Search ........................... 428/474.4, 476.3, 428/221, 411.1

(56) References Cited

U.S. PATENT DOCUMENTS

| | | | |
|---|---|---|---|
| 5,132,182 A | * | 7/1992 | Grosse-Puppendahl et al. .. 428/475.8 |
| 5,462,493 A | * | 10/1995 | Simpson ...................... 474/111 |
| 6,059,679 A | * | 5/2000 | Tsutsui et al. .............. 474/135 |
| 6,214,277 B1 | * | 4/2001 | Saigo et al. ................ 264/443 |

FOREIGN PATENT DOCUMENTS

| | | |
|---|---|---|
| DE | 197 21 199 | 11/1998 |
| FR | 2 736 123 | 1/1997 |
| JP | 10-103435 | 4/1998 |
| JP | 11-79349 | 3/1999 |

OTHER PUBLICATIONS

Jap. Abstract 11079349A, application published Mar. 23, 1999.

Jap. Abstract 02810448, application published Aug. 20, 1996.

* cited by examiner

Primary Examiner—P. Hampton-Hightower
(74) Attorney, Agent, or Firm—Dann, Dorfman, Herrell and Skillman, P.C.; Henry H. Skillman

(57) ABSTRACT

A shoe for a tensioner device and chain guide is formed a polyamide 66 or 46 resin mold product having a relative viscosity more than 100 (90% formic acid method). A skin layer of the resin mold product includes a non-spherulite area less than 100 μm in thickness. The shoe excels in the wear resistance, slidability, impact resistance, heat resistance, and oil resistance, has a high degree of freedom in the shape, and excels in the workability.

6 Claims, 4 Drawing Sheets

SHOE FOR TENSIONER DEVICE AND CHAIN GUIDE

BACKGROUND OF THE INVENTION

1. Field of the Invention

The present invention relates to a shoe for a tensioner device and chain guide used to prevent vibrations of a timing chain (roller chain, silent chain, etc.) that is used in a timing drive (cam shaft drive, balancer drive, injection drive, etc.) of an automobile engine.

2. Related Art

A timing chain used in a timing drive of an automobile engine is associated with a tensioner device disposed on the outside of a slack run of the chain for removing a looseness or slack of the chain, and a chain guide disposed along a tension run of the chain. for preventing a run out of the chain during traveling.

FIG. 2 is a front view illustrating one example of a timing drive of an automobile engine on which such a tensioner device and a chain guide are mounted, and FIG. 3 is a front view illustrating another example of the same.

The timing drive of the automobile engine as shown in FIG. 2 will be explained. A first chain 3 is hung over a driving sprocket 1 fixed to a crankshaft of the engine and an intermediate sprocket 2, and a second chain 6 is hung over the intermediate sprocket 2 and driven sprockets 4, 5 each fixed to one of camshafts. Thus, a rotation of the crankshaft is transmitted from the driving sprocket 1 to the intermediate sprocket 2 through the first chain 3, and a rotation of the intermediate sprocket 2 is transmitted to the driven sprockets 4, 5 through the second chain 6, whereby each of the camshafts is driven to rotate.

A first tensioner device 7 to remove a looseness or slack of the first chain 3 is disposed on the outside of a slack run of the first chain 3. The first tensioner device 7 includes a tensioner 8 and a lever 9. The lever 9 includes a base 9A and a shoe 9B attached to the base 9A. A proximal end of the lever 9 is pivotally connected to an engine block not illustrated, and the front end of a plunger 8A of the tensioner 8 pressures the lever 9 on a backside near the front end thereof. Thereby, the shoe 9B of the lever 9 is held in sliding contact with a traveling face of the first chain 3 so as to apply a tension to the first chain 3, thereby eliminating a slack of the first chain 3.

A chain guide 10 to prevent a run out of the first chain 3 during traveling is disposed along a tension run of the first chain 3 The chain guide 10 includes a frame body 10A of the chain guide 10 and a shoe (not illustrated) that slides on the traveling face of the first chain 3. The chain guide 10 is also attached to the engine block not illustrated. The shoe of the chain guide 10 is in sliding contact with the traveling face of the first chain 3 so as to prevent a run out of the first chain 3 during traveling.

Further, a second tensioner device 11 to remove a slack of the second chain 6 is disposed on the outside of a slack run of the second chain 6. In the second tensioner device 11, a shoe 11C is attached on the front end of a plunger 11A through a base 11B, and the shoe 11C is urged by the plunger 11A in the thrust direction. Thereby, the shoe 11C is in sliding contact with the traveling face of the second chain 6 so as to apply a tension to the second chain 6, thereby eliminating a slack of the second chain 6.

Next, the timing drive of the automobile engine as shown in FIG. 3 will be explained. A chain 7 is hung over the driving sprocket 1 fixed to the crankshaft of the engine and the driven sprockets 4, 5 each fixed to one of the cam shafts. Thus, a rotation of the crankshaft is transmitted from the driving sprocket 1 to the driven sprockets 4, 5 through the chain 7, whereby each of the camshafts is driven to rotate.

A first tensioner device 12 to remove a looseness or slack of the chain 7 is disposed on the outside of a slack run of the chain 7. The tensioner device 12 includes a tensioner 13 and a lever 14. The lever 14 includes a base 14A and a shoe 14B attached to the base 14A. A proximal end of the lever 14 is pivotally connected to an engine block not illustrated, and the front end of a plunger 13A of the tensioner 13 pressures the lever 14 on a backside near the front end thereof. Thus, the shoe 14B of the lever 14 is held in sliding contact with a traveling face of the chain 7 so as to apply a tension to the chain 7, thereby eliminating a slack of the chain 7.

A chain guide 15 to prevent a run out of the chain 7 during traveling is disposed along a tension run of the chain 7. The chain guide 15 includes a frame body 15A of the chain guide 15 and a shoe (not illustrated) that slides on the traveling face of the chain 7. The chain guide 15 is also attached to the engine block not illustrated. The shoe of the chain guide 15 is in sliding engagement with the traveling face of the chain 7 to thereby prevent a run out of the chain 7 during traveling.

Here, in the foregoing shoe for the tensioner device and chain guide, conventionally, a heat resistant synthetic rubber has been used.

However, an automobile engine normally operates under a condition that is totally different from a common working condition. For example, the speed of the chain being used in combination with the shoe is very high, and the pressure to the shoe is also high. Also, the atmosphere contains oil, and the temperature of the oil rises to approximately 140° C. at maximum. Accordingly, use of the heat resistant synthetic rubber as a shoe for a tensioner device and chain guide in an automobile engine gives rise to the following problems.

The heat resistant synthetic rubber has a high frictional resistance because of a high coefficient of friction. Therefore, the loss in operation becomes increased to thereby decrease the fuel efficiency.

The heat resistant synthetic rubber raises the hardness when a thermal stress is given. Especially in a high temperature, the vulcanization progresses on the surface of the heat resistant synthetic rubber, and the hardness rises. There occurs a breakage or a peeling due to the hardening. And, the chain is likely to become worn by the hardening. As a result, the life of the chain, or the life of the engine becomes shortened.

The heat resistant synthetic rubber does not have a very high degree of freedom in the shape, and the designing such as avoiding interfering objects, etc., becomes difficult to perform. This leads to a limited degree of freedom in engine layout.

The heat resistant synthetic rubber has a poor workability, and the total cost becomes increased as well. A preliminary treatment is needed for a base (aluminum alloy, iron, etc.) on which the heat resistant synthetic rubber is applied, and moreover the adhesion and vulcanization processes are necessary. The adhesion of the aluminum alloy to the heat resistant synthetic rubber is not easy to carry out, and the workability is not good. The processing cost of the heat resistant synthetic rubber itself and the processing cost of the base material are increased. In addition, the stock is prolonged because the shoe and the base are produced in the individual processes, and the delivery is also prolonged. Furthermore, the total weight is increased, consequently the total weight of the engine is increased, and the fuel efficiency is lowered.

SUMMARY OF THE INVENTION

Accordingly, the invention intends to solve the conventional problems as mentioned above, and provides a shoe that excels in the wear resistance, slidability, impact resistance, heat resistance, and oil resistance, has a high degree of freedom in the shape, and excels in the workability.

In view of the foregoing object, a shoe for a tensioner device and chain guide according to the invention comprises a resin mold product of a polyamide 66 or a polyamide 46 having a relative viscosity more than 100 (90% formic add method), the resin molded product having a skin layer including a non-spheruite area less than 100 μm in thickness.

With the use of a resin mold product of a polyamide 66 or a polyamide 46 having a relative viscosity more than 100 (90% formic acid method) and also having a skin layer including a non-spherulite area less than 100 μm in thickness, the shoe for a tensioner and chain guide of the invention excels in the wear resistance, sidability, impact resistance, heat resistance, and oil resistance, has a high degree of freedom in the shape, and excels in the workability

DETAILED DESCRIPTION OF THE PREFERRED EMBODIMENTS

The preferred embodiments of the invention will be described with reference to the accompanying drawings.

Figure 1A:
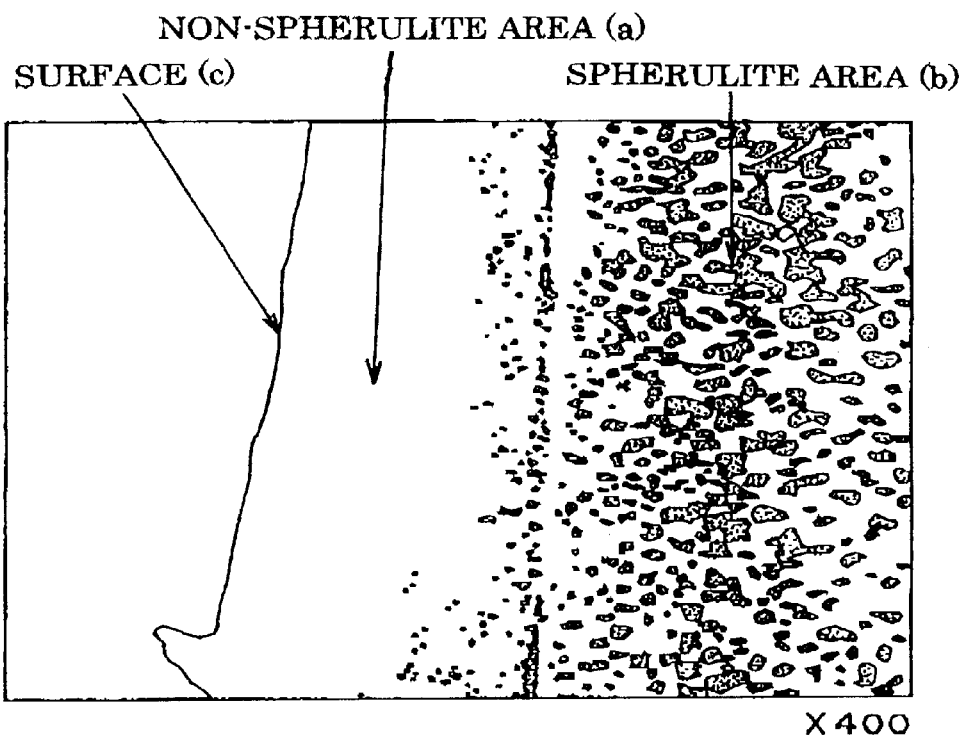
FIG. 1A is a view illustrating the structure of a resin mold product of a polyamide 66 or 46 observed by a polarization microscope (magnification: 400), which is used for the shoe for a tensioner device and chain guide according to the present.
Figure 1B:
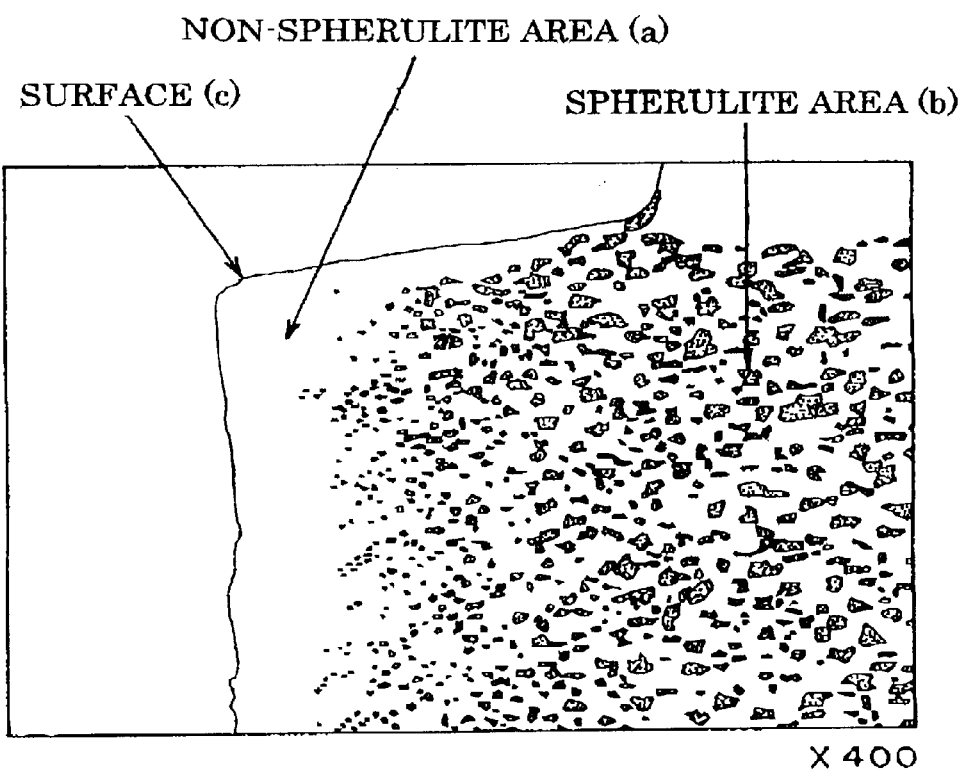
FIG. 1B is a view similar to FIG. 1, but showing another example of the resin mold product according to the present invention.
Figure 2:
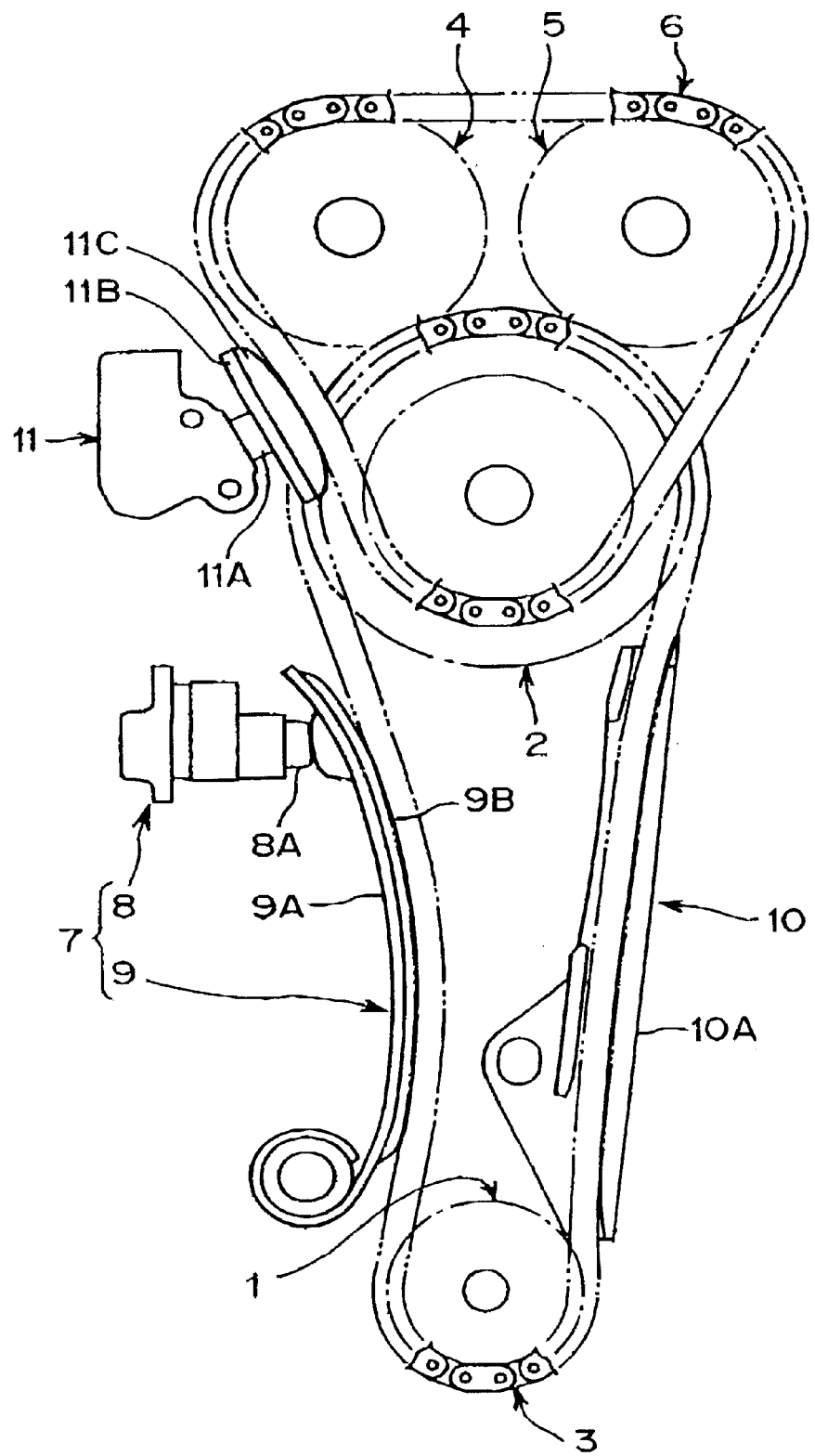
FIG. 2 is a front view illustrating one example of a timing drive of an automobile engine on which tensioner devices and a chain guide are mounted.
Figure 3:
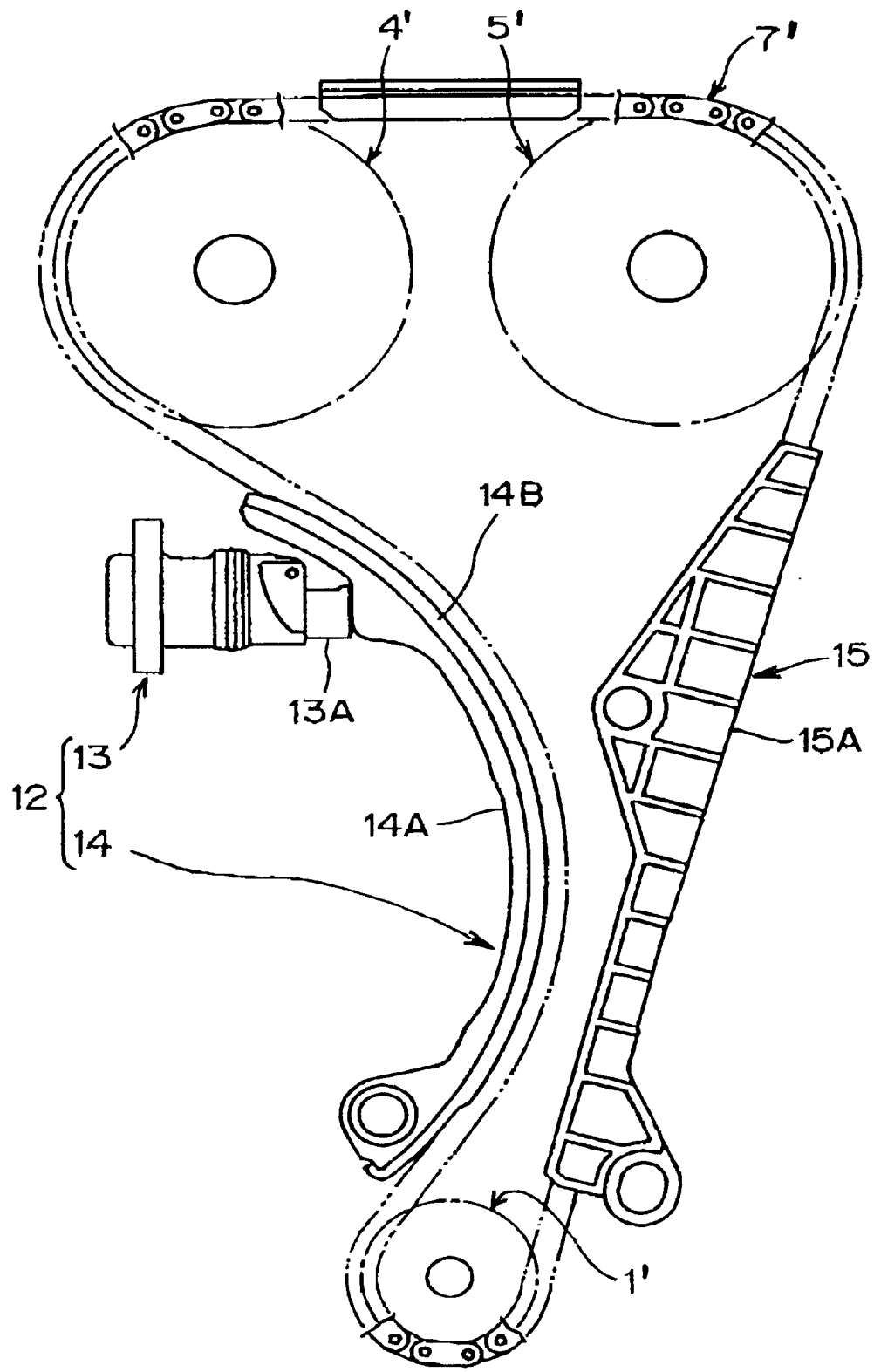
FIG. 3 is a front view illustrating another example of a timing drive of an automobile engine on which a tensioner device and a chain guide are mounted.

FIGS. 1A and 1B are views illustrating the structure of typical examples of resin mold products observed by a polarization microscope (magnification: 400), which are used for the shoe for a tensioner device and chain guide according to the present. In FIGS. 1A and 1B, (a) illustrates a non-spherulite area, (b) illustrates a spherulite area and (c) illustrates a surface of each resin mold product.

The resin mold products are molded from polyamide 66 resin or polyamide 46 resin having a relative viscosity more than 100 (90% formic add method).

The shoe for a tensioner and chain guide of the invention is made of the polyamide 66 resin or the polyamide 46 resin by the general injection molding method. The die temperature, resin temperature, pressure, time, etc., during injection molding are assumed to be the recommendations by the material manufacturer.

As additive agents to the polyamide 66 resin or the polyamide 46 resin, the following may be added in accordance with the required properties of different engines, within 50 wt % according to the purpose thereof: (1) elastomer composition for viscosity adjustment, (2) color master batch for coloring, (3) lubricating material such as molybdate sulfide, graphite, and tetrachloroethylene, (4) reinforcing short fiber such as glass fiber, carbon fiber, and aramid fiber, and (5) powdered or spheroidal dimension stabilizer such as calcium carbonate and glass.

The properties required for the shoe for a tensioner and chain guide were examined in comparison with the polyamide 66 resin, polyamide 46 resin, the heat resistant synthetic rubber, phenol resin, and polypropylene resin, and the results are shown in Table 1.

TABLE 1

Property comparison: heat resistant synthetic rubber material vs. resin material

| Material Item | Heat resistant synthetic rubber (NBR) | Phenol (PF) | Polypropylene (PP) | Polyamide 66 (PA) | Polyamide 46 (PA) |
|---|---|---|---|---|---|
| Wear resistance | Δ | Δ | Δ | ○ | ◎ |
| Slidability | X | X | Δ | ○ | ○ |
| Impact resistance | X | X | Δ | ○ | ○ |
| Heat resistance | Δ | X | X | ○ | ◎ |
| Oil resistance | Δ | ○ | ○ | ○ | ○ |
| Total cost | X | ○ | ○ | ◎ | ○ |

In the table, ◎ denotes optimum, ○ denotes appropriate, Δ denotes slightly inappropriate, X denotes inappropriate.

More preferable is a resin mold product of a thin skin layer (the non-spherulite area as shown in (a) in FIG. 1A and FIG. 1B), and still more preferable is a resin mold product having a skin layer including a non-spherihte area (a) less than 100μm in thickness.

Figure 4:
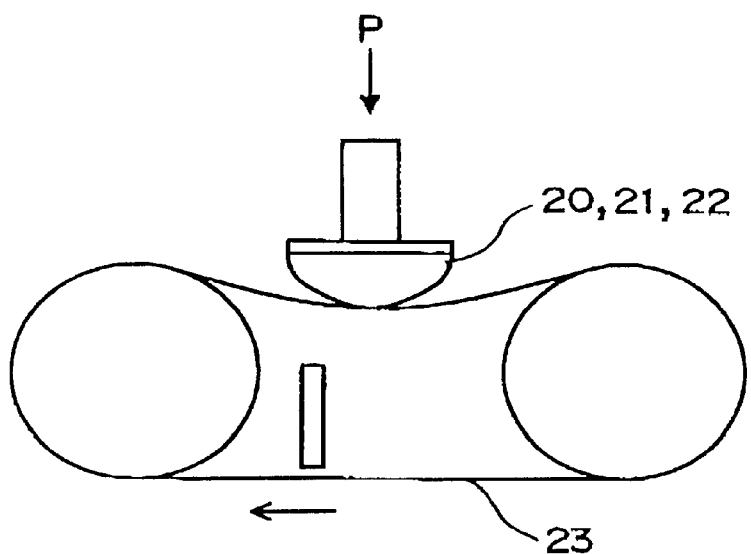
FIG. 4 is a schematic view showing a wear resistance testing equipment.

FIG. 4 is a schematic view showing a wear resistance testing equipment. Using the wear resistance testing equipment shown in FIG. 4, a wear resistance test was made with a test specimen 20 of a shoe made of the heat resistant synthetic rubber, a test specimen 21 of a shoe made of the polyamide 66 resin or the polyamide 46 resin, and a test specimen 22 of a shoe made of the polyamide 66 resin or the polyamide 46 resin having a skin layer less than 100 μm in thickness, where the test specimen is forced against the traveling chain 23 with a load P applied thereto.

The test conditions are as follows.

Circumferential speed: 40 m/sec

Load: 50 N

Oil: engine oil

Oil temperature: 140° C.

Oil quantity: 1 L/min

Figure 5:
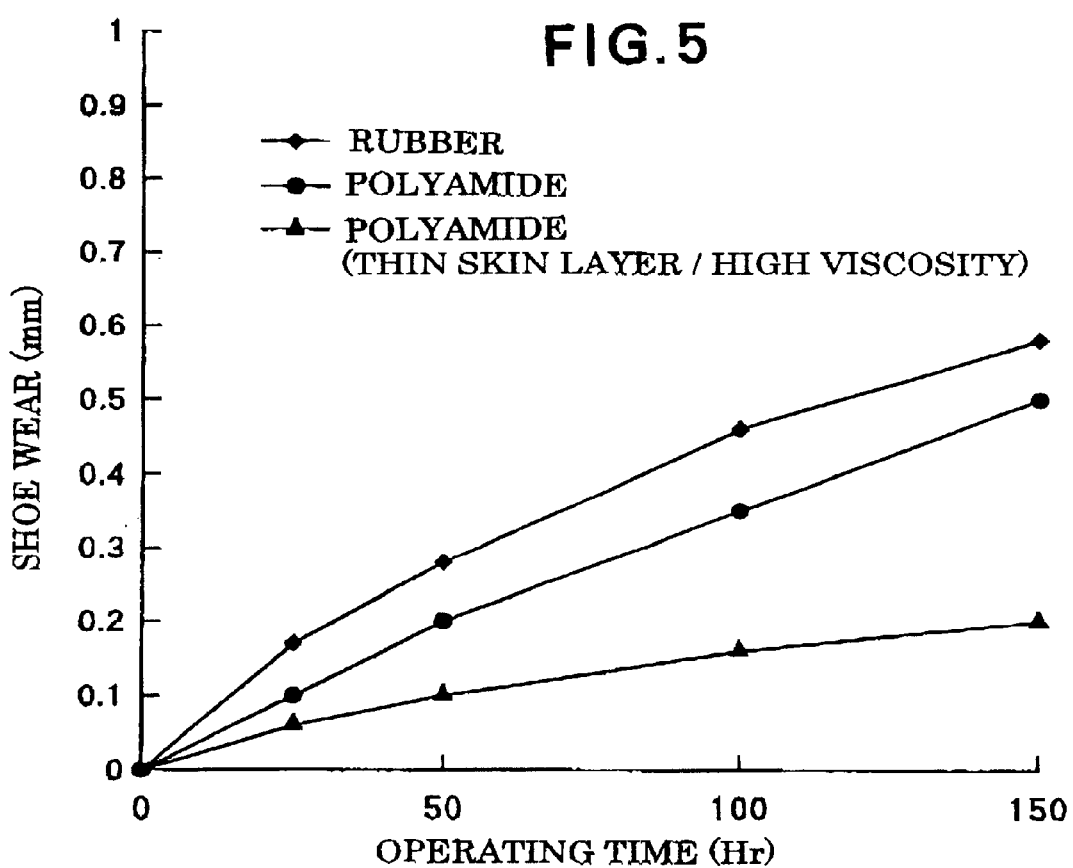
FIG. 5 is a graph illustrating a relation of the shoe wear against the operating time.

FIG. 5 is a graph illustrating a relation of the shoe wear against the operating time. As shown in FIG. 5, the polyamide 66 resin or the polyamide 46 resin has a less wear than the heat resistant synthetic rubber, and the polyamide 66 resin or the polyamide 46 resin with skin layer of less than 100 μm in thickness has the least wear.

Further, the resin mold product of the polyamide 66 or 46 having a relative viscosity more than 100 (90% formic acid method) and also having a skin layer including a nonaspherulite area (a) less than 100 μm in thickness can be attached to the base of a lever of the tensioner device or to a frame body of the chain guide. In addition, the lever or the chain guide can be made up only with the resin mold product.

As described above, the shoe for a tensioner device and chain guide according to the invention comprises a resin mold product of polyamide 66 or 46 resin having a relative viscosity more than 100 (90% formic acid method), and also having a skin layer including a non-spherllite area less than 100 μm in thickness. The thus constructed shoe excels in the wear resistance, slidability, impact resistance, heat resistance, and oil resistance, has a high degree of freedom in the shape, and excels in the workability.

When a lever or a chain guide is made up only with the polyamide 66 or 46 resin mold product with relative viscosity more than 100 (90% formic acid method) and having non-spherulite area of the skin layer less than 100 μm in thickness, it is possible to prevent a shoe from being peeled off the base of the lever or the frame body of the chain guide and avoid a cost increase which may occur when the shoe is attached to the base of the lever or the frame body of the chain guide.

Obviously, various minor changes and modifications of the present invention are possible in the light of the above teaching. It is therefore to be understood that within the scope of the appended claims, the present invention may be practiced otherwise than as specifically described.

What is claimed is:

1. A shoe for a tensioner device and chain guide, comprising a resin mold product of polyamide 66 or polyamide 46 having a relative viscosity ore than 100 (90% formic acid method), said resin mold product having a spherulite area and a non-spherulite area, said non-apherulite area forming a skin layer including a non-spherulite area less than 100 μm in thickness.

2. A shoe according to claim 1, wherein said resin mold product is added with less than 50 wt % of an additive agent including am elastomer composition for viscosity adjustment, a color master batch for coloring, a lubricating materal, a reinforcing short fiber, a dimension stabilizer, or a combination thereof.

3. A shoe according to claim 2, wherein said lubricating material includes molybdate sulfide, graphite, and tetrachloroethylene.

4. A shoe according to claim 2, wherein said reinforcing short fiber includes glass fiber, carbon fiber and aramid fiber.

5. A shoe according to claim 2, wherein said dimension stabilizer includes calcium carbonate and glass.

6. A shoe according to claim 1 wherein said shoe is a unitary resin mold product, said skin layer being an integral part of said product.

* * * * *

UNITED STATES PATENT AND TRADEMARK OFFICE
CERTIFICATE OF CORRECTION

PATENT NO.    : 6,428,899 B1
DATED         : August 6, 2002
INVENTOR(S)   : Fujiwara et al.

It is certified that error appears in the above-identified patent and that said Letters Patent is hereby corrected as shown below:

Column 3,
Lines 12 and 59, "add" should be -- acid --;

Column 5,
Line 9, "non-spherllite" should be -- non-spherulite --;

Column 6,
Line 6, "non-apherulite" should be -- non-spherulite --;
Line 12, "am" should be -- an --.

Signed and Sealed this

Fifth Day of August, 2003

JAMES E. ROGAN
*Director of the United States Patent and Trademark Office*